United States Patent [19]

Germer et al.

[11] 3,846,789

[45] Nov. 5, 1974

[54] REMOTE-READING REGISTER WITH ERROR DETECTING CAPABILITY

[75] Inventors: Warren R. Germer, Rochester; Ansell W. Palmer, Hampton, both of N.H.

[73] Assignee: General Electric Company, Pitsfield, Mass.

[22] Filed: Apr. 6, 1973

[21] Appl. No.: 348,513

[52] U.S. Cl.......... 340/347 P, 346/14 MR, 340/204

[51] Int. Cl.............................................. G08c 9/06

[58] Field of Search........ 340/347 P, 188, 180, 204, 340/146.1; 346/14 MR; 250/231 SE; 178/7.6

[56] References Cited

UNITED STATES PATENTS

| | | | |
|---|---|---|---|
| 2,067,098 | 1/1937 | Rogers | 340/180 |
| 2,779,539 | 1/1957 | Darlington | 340/347 P |
| 2,793,807 | 5/1957 | Yaeger | 340/347 P |
| 3,003,842 | 10/1961 | Langford et al. | 346/14 MR |
| 3,083,357 | 3/1963 | Chapin et al. | 340/204 |
| 3,117,182 | 1/1964 | Hell et al. | 178/7.6 X |
| 3,229,280 | 1/1966 | Chapin | 340/347 P |
| 3,310,801 | 3/1967 | Hood, Jr. et al. | 340/347 P |

*Primary Examiner*—Charles D. Miller
*Attorney, Agent, or Firm*—Volker R. Ulbrich; Francis X. Doyle; John J. Kelleher

[57] ABSTRACT

A remote-reading register includes an optical encoding mechanism for encoding the angular position of each shaft in a six bit digital code. The mechanism comprises a six bit slotted gray code disc rigidly attached to each shaft and scanned by a single rotating disc having a series of scan slots which scan across a corresponding reading slot in a backplate. Illumination through aligned encoding slot, scan slot, and reading aperture is from a single light source. Output light from the reading slot is sensed by a single photosensor.

The register also comprises an additional identification reading slot covered by a slotted identification coding plate. The identification reading slot may be read as are the other reading slots to provide a meter identification code along with the coded position message.

Also disclosed is a method of remotely reading a meter register, comprising generating a position code for indicator shafts and interpositionally cross-checking the codes of different shafts to detect erroneous code combinations in a code message.

3 Claims, 9 Drawing Figures

REMOTE-READING REGISTER WITH ERROR DETECTING CAPABILITY

BACKGROUND OF THE INVENTION

The present invention relates to meter registers adapted for remote-reading.

Various types of meters such as electric, gas, and water meters, include a register for indicating quantitatively that which is being metered. Such registers generally comprise a decade gear train having a dial indicator coupled to each of the gear train shafts and are well known in the meter art.

Meters are extensively used by utility companies to measure electricity, gas or water supplied to consumers. The meter is installed at the consumer location. Periodically, generally once each month, a representative of the utility reads the indicator dials on the meter registers at the consumer location to determine the quantity of electricity, gas or water supplied. The performance of such a reading procedure at the consumer locations results in a substantial expense to the utility company. Thus, a number of schemes have been devised for reading a meter at a location remote from the meter, thus saving the time and labor. Generally, such schemes have involved electrically encoding the position of the register indicator dial by some means and then transmitting the coded information, or message, by carriers such as telephone lines, power transmission lines, or coaxial service lines, to a remote location, where it is decoded. Detailed discussion of apparatus and techinques for remote-reading meter registers are found, for example, in the following references.

| | | | |
|---|---|---|---|
| Technical Publication | | | |
| | Bailey, S. J. | | Remote Reading of Utility Meters, in Control Engineering, June 1972 page 52 – 57 |
| U. S. Patents | | | |
| | 3,165,733 | Issued | to A. Brothman et al on 12 January 1965 |
| | 3,314,063 | Issued | to A. Brothman et al on 11 April 1967 |
| | 3,445,841 | Issued | to N. P. Parkinson on 20 May 1969 |
| | 3,683,368 | Issued | to T. L. Ebner on 8 August 1972 |

As discussed in the above references, there are several important problems associated with the design of a meter register for remote reading. In addition to the relatively obvious requirements that a remote-reading register be simple, rugged, reliable, and readable by machine, there is a definite size and shape limitation. Because of the large number of meters of various types already installed, a remote-reading register should fit to existing meters, replacing the register on that meter. This size limitation is a rather severe restriction, since registers are already rather small in size to reduce the cost. Also, the remote-reading register should be capable of operating as an ordinary register during the time needed by the utility to make the transition from a normal reading of meters to a remote reading.

In addition to the above requirements, it is generally considered very desirable that the remotely read figure for a particular meter at any time be precisely the same as the figure showing on the meter register indicators. This would allow the customer to compare the remotely read figure on his billing statement to the figure on his meter, to satisfy himself as to the accuracy of the remote reading.

Providing precise correspondence between the remotely read figure and the figure shown by the register indicators of the meter, however, has thus far posed serious difficulties. A first difficulty is due to a certain amount of ambiguity which appears even in reading the register indicators at the meter location. This ambiguity is inherent in reading a continuous motion register and is aggravated by mechanical shortcomings of the register, such as backlash in the gear train and limited precision in the parts. A second difficulty is that associated with the nature of the coded message received at the remote reading location. The received message may contain an error due either to noise introduced in the transmission process from the meter to the remote location, or to a mechanical fault in the encoding mechanism of the register which generates the information to be transmitted. While there are presently ways for effectively resolving the first difficulty of the ambiguity in the encoding process of the register, the second difficulty of detecting the transmission of an erroneous message remains.

SUMMARY OF THE INVENTION

The novel remote-reading register in accordance with the present invention comprises an encoding mechanism having the capability to resolve ambiguity in formulating an encoded message representative of the figure shown by the register indicators, and having in addition thereto the capability to provide encoded information which may be utilized to detect the transmission of erroneous encoded messages.

With the novel remote-reading register, there is a high degree of assurance that an accepted reading at the remote location is, in fact, precisely the same as would be a visual reading directly from the dial indicators on the face of the meter at the meter location.

DESCRIPTION OF THE PREFERRED EMBODIMENTS

Figure 1:
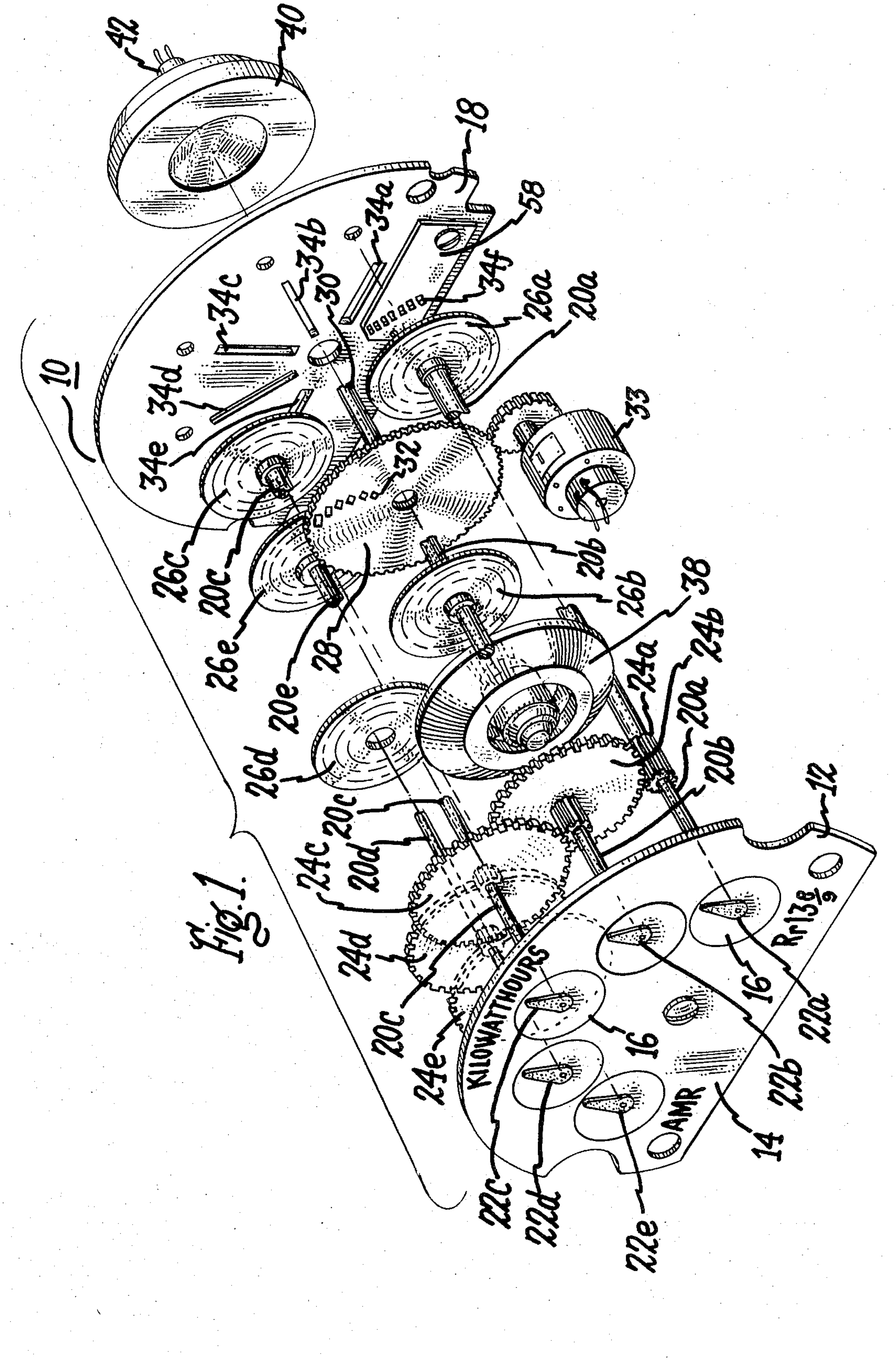
FIG. 1 is an exploded view of a remote-reading kilowatthour meter register having an encoding mechanism in accordance with a preferred embodiment of the invention.

Structure — The preferred embodiment of the invention shown in the exploded view of FIG. 1 in order to facilitate description of the detail, is a remote-reading register 10 for a kilowatthour meter. A faceplate 12 is provided with an outside indicator face 14 having circular scalar, or dial markings 16. Spaced from the faceplate 12 by about ⅞ inches, and parallel to it, is a backplate 18. Between the faceplate 12 and the backplate 18, and born at points on the plates 12, 18, are a set of five dial-indicator shafts 20*a*, 20*b*, 20*c*, 20*d*, and 20*e* which extend through the faceplate 12 and have indicators 22*a*, 22*b*, 22*c*, 22*d*, and 22*e* rigidly attached to the ends, respectively. The indicator shafts 20 are mutually parallel and are arranged so that their end points at the plates 12, 18 fall on an arc of about one inch radius. A series of decade gears 24*a*, 24*b*, 24*c*, 24*d*, 24*e*, are rigidly attached to the shafts 20 near the faceplate 12 and rotatably couple the shafts 20 to form a decade gear train. Each of the dial-indicator shafts 20 is further provided between its gear 24 and the backplate 18 with an optical encoding disc 26*a*, 26*b*, 26*c*, 26*d*, and 26*e*.

Adjacent the optical encoding discs 26 is a scan disc 28 on a separate scan shaft 30 parallel to the dial indicator shafts 20 and extending from a bearing point at the center of the arc formed by the bearing ends of the dial indicator shafts 20 at the backplate 18. The scan disc 28 is disposed between the encoding discs 26*b*, 26*d*, and discs 26*a*, 26*c*, and 26*e*, and is provided with a series of radially spaced, rotationally staggered scan slots 32. The scan disc 28 is provided with gear teeth about its periphery. A small synchronous drive motor 33, provided on its output shaft with a pinion gear meshing with the scan disc 28, is arranged to drive the scan disc 28 at 12 revolutions per second.

About the bearing point of the scan disc shaft 30 on the backplate 18 is a semi-circular configuration of narrow reading slots 34*a*, 34*b*, 34*c*, 34*d*, and 34*e* arranged at equal angles of 45° to one another, corresponding to the angle between bearing points of the dial indicator shafts 20 at the backplate 18.

Disposed between the gears 24 of the decade gear train and the closest encoding disc 26*d*, is light source 38 for illuminating the encoding disc 26. The light source 38 is arranged to direct collimated light perpendicularly to the face of the encoding disc 26.

Mounted on the outside of the backplate 18, and located centrally with respect to the center of the semi-circular configuration of reading slots 34 is a Cassegrainian light collector 40 having a photosensor 42 located at the central focus point of the collector 40. The encoding discs 26, the scan disc 28, the inside surfaces of the faceplate 12 and backplate 18, and certain other associated members are covered with a flat back coating to minimize the effects of sparious light reflections on the photosensor 42.

The end of the lowest order indicator shaft 20*a* extends to the outer side of the backplate and is rotatably coupled to an input gear drive assembly, not shown, which is driven by the metering drive shaft of the meter.

Figure 2:
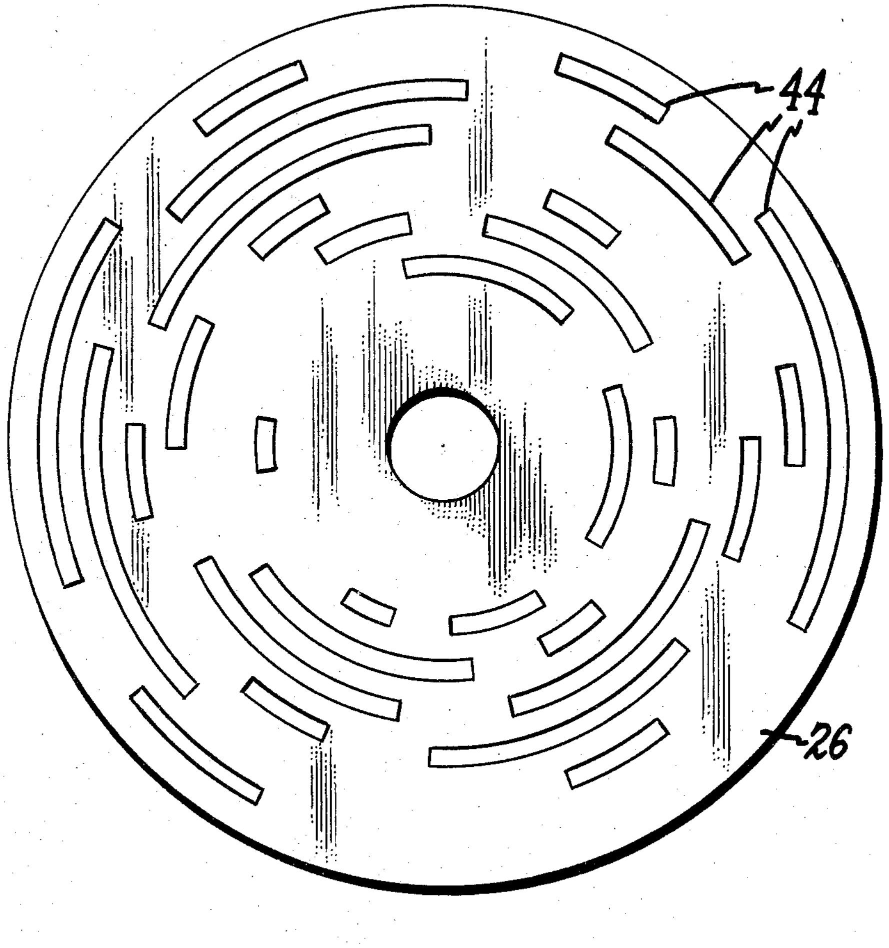
FIG. 2 is an enlarged view of the face of an encoding disc of the encoding mechanism of FIG. 1.

One of the optical encoding discs 26, which are all identical, is shown in greater detail in FIG. 2. The disc 26 is a stamped aluminum member about 1¼ inches in diameter, and having six concentric rings, or channels of encoding slots 44 of varying lengths. Such an encoding disc is generally known as a six-bit optical gray code disc. For a given radial position on the disc 26 the radial pattern of encoding slots 44 present at that position yield a six bit binary code which unambiguously defines the position as one of 60 radial positions on the disc 26. The relative orientations of the encoding discs 26 of the register 10 and the reading slots 34 are such that each reading slot 34 defines a radially extending, narrow reading area on only one of the encoding discs 26. The pattern formed by the encoding slots 44 of the encoding disc 26 as viewed through the reading aperture 34 and read from one end of the reading slot 34 to the other end thus gives binary code information by which the angular position of the encoding disc can be determined to within approximately one of 60 positions. Since the presence or absence of a portion of an encoding slot 44 in the encoding disc 26 as observed through the reading slot 34 may be represented by zero or 1, the observed pattern is by its nature a binary code.

Figure 3:
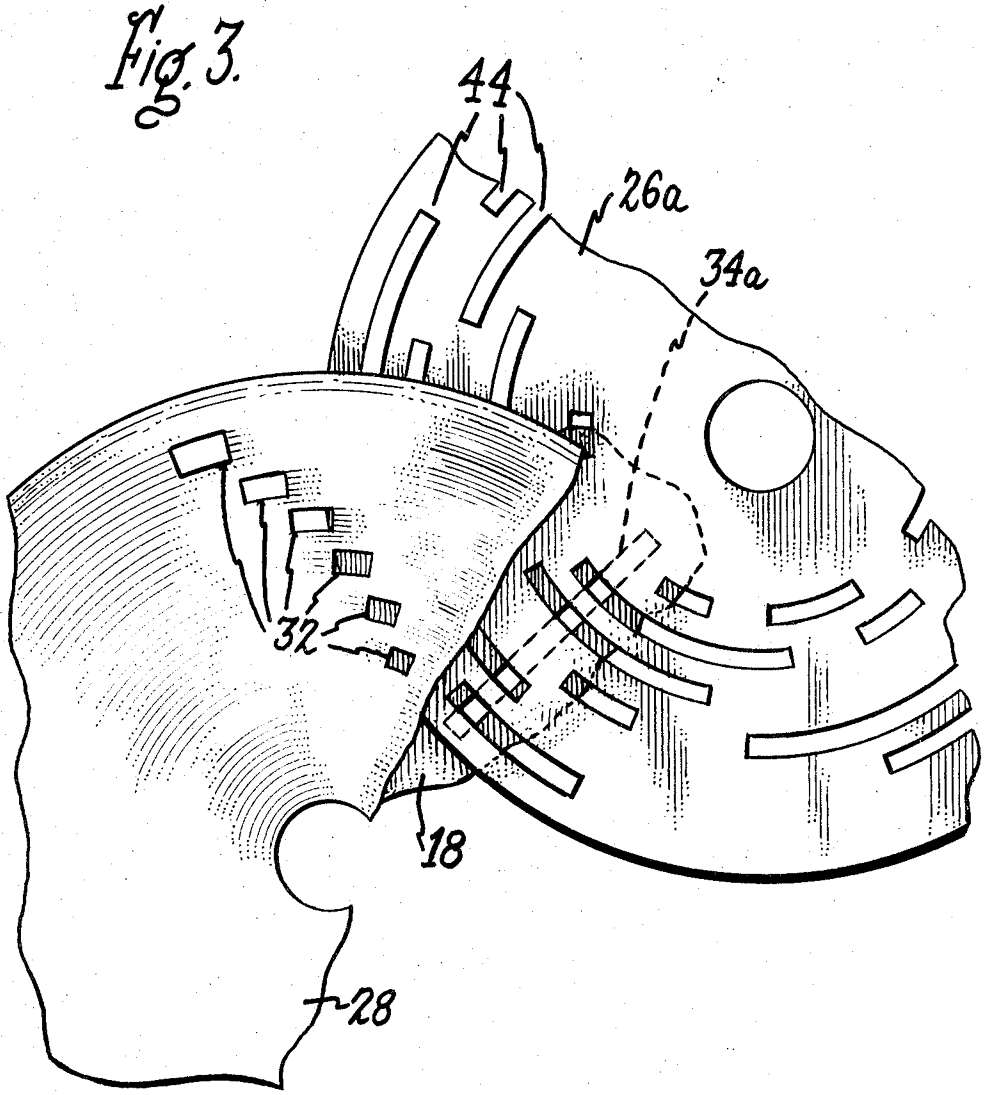
FIG. 3 shows fragments of an encoding disc of FIG. 2, together with associated means for reading the positional information from the encoding disc by an aligned reading slot and a scan disc of the encoding mechanism of FIG. 1.

The scan disc 28, in cooperation with the light source 38 will, upon rotation, perform a linear light scan of each of the five reading slot patterns in sequence, since it rotates about the center of the semi-circular configuration of the reading slots 34. This is further illustrated in FIG. 3, which shows a reading area of the lowest order encoding disc 26*a* aligned with the corresponding reading slot 34*a* as seen from the light source 38. The scan disc 28 rotates counter-clock-wise and is about to scan the reading area.

As the pattern of staggered scan slots 32 in the scan disc 28 rotates across the reading area aligned with the reading slot 34*a* there will be a time-based succession of light pulses from the reading slot 34*a* which will be collected by the collector 40 and converted to electrical pulses by the photosensor 42. All five encoding discs 26 are scanned by a single rotation of the scan disc 32. Due to the scanning nature of the scan slots 32 as they pass sequentially over the reading area defined by the scan slot 34*a*, only a single light source and a single collector are needed.

Figure 4:
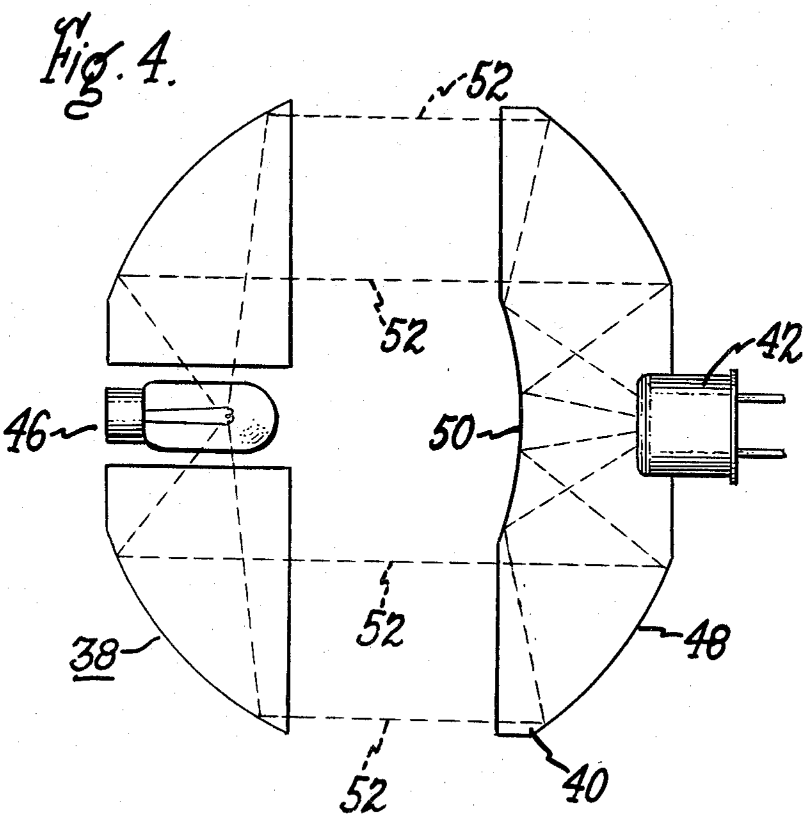
FIG. 4 is a sectional view of an optical reading illumination and sensing assembly of the encoding mechanism of FIG. 1.
Figure 7:
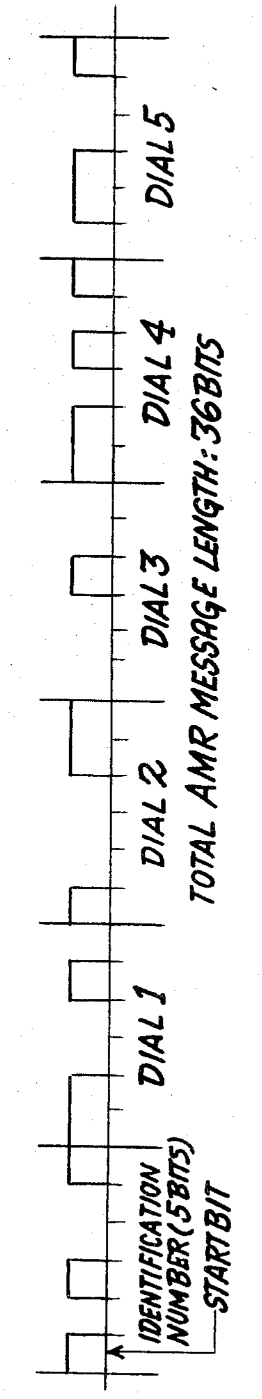
FIG. 7 is further illustrative of the encoded message of FIG. 6.

The light source 38 and collector 40 are shown in greater detail in FIG. 4, spaced from one another. The light source 38 is a clear plastic parabolic reflector of about 1½ inches in diameter and provided with a 3 watt tungsten lamp 46 with its filament at its focus point. The collector 40 is a clear plastic Cassegrainian reflector also about 1½ inches in diameter and having a primary reflective surface 48 and a secondary reflective surface 40. The photosensor 42 is located at the focus point of the collector. As is indicated by the dashed lines 52 of FIG. 4, light from anywhere but the central region of the light source 38 will be collected by the collector 40 after passing through the aligned scan slots 32, encoding slots 44, and reading slots 34 to generate an electrical pulse.

Figure 5:
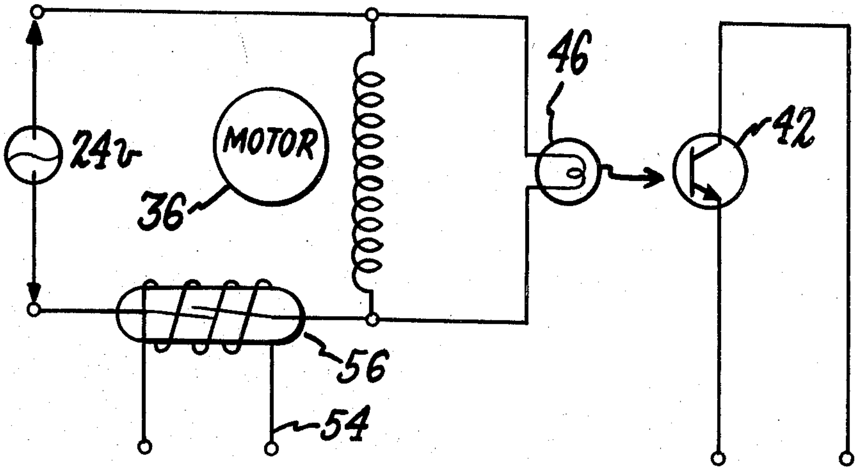
FIG. 5 is a schematic electrical circuit for an optical reading assembly of the encoding mechanism of FIG. 1.

FIG. 5 shows a schematic electrical circuit for the lamp 46, the drive motor 36, and the photosensor 42. The remote reading of the register is initiated by a signal current pulse from a remote interrogation unit through wire 54 to close a reed switch 56, thereby activating the synchronous drive motor 33 and the lamp 46.

Figure 6:
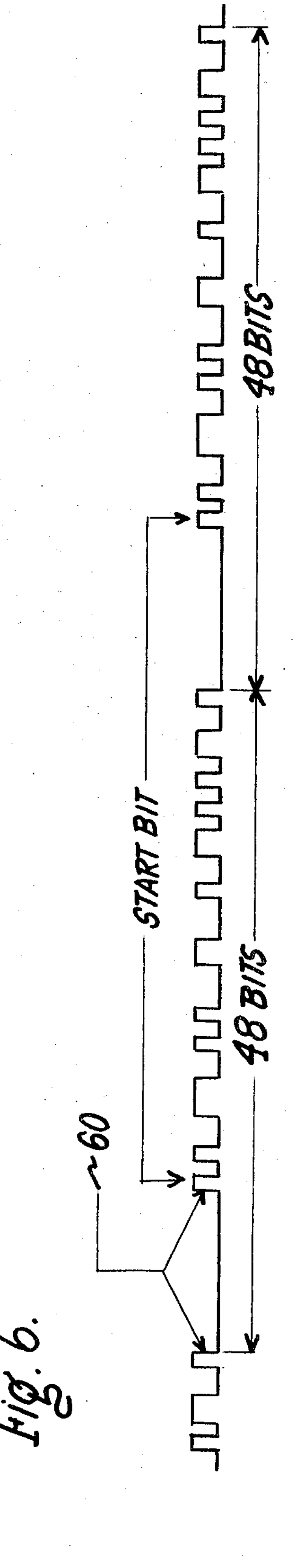
FIG. 6 is a chart representative of an encoded electrical message signal from the register of FIG. 1 as encoded by the encoding mechanism.

The time-based output of the photosensor 42 for a complete revolution of the scan disc is illustrated in FIG. 6 as a complete message. Since the angular position of each encoding disc is fixed with respect to the dial indicator pointer on the indicator shaft, this message determines the respective actual position of the pointer relative to the faceplate 12 dial markings 16 shaft. An additional reading aperature slot **34*f*, shown in FIG. 1 is provided in the backplate 18 of the meter 10 for use identifying the register over this identification slot 34*f*. A stationary encoding plate 58** is placed to add to the message a five bits for indicating the identity of the meter being read.

FIG. 6 shows a time-based graph of two redundant 36 bit typical output messages of the register 10, separated by a 12 bit "dead band" region 60, representative of rotation of the scan disc over the non-slotted region of the backplate 18. In the message, the first bit is a "start" bit, the next five bits identify the particular register, and the remaining 30 bits are shaft position information.

Figures 8, 9:
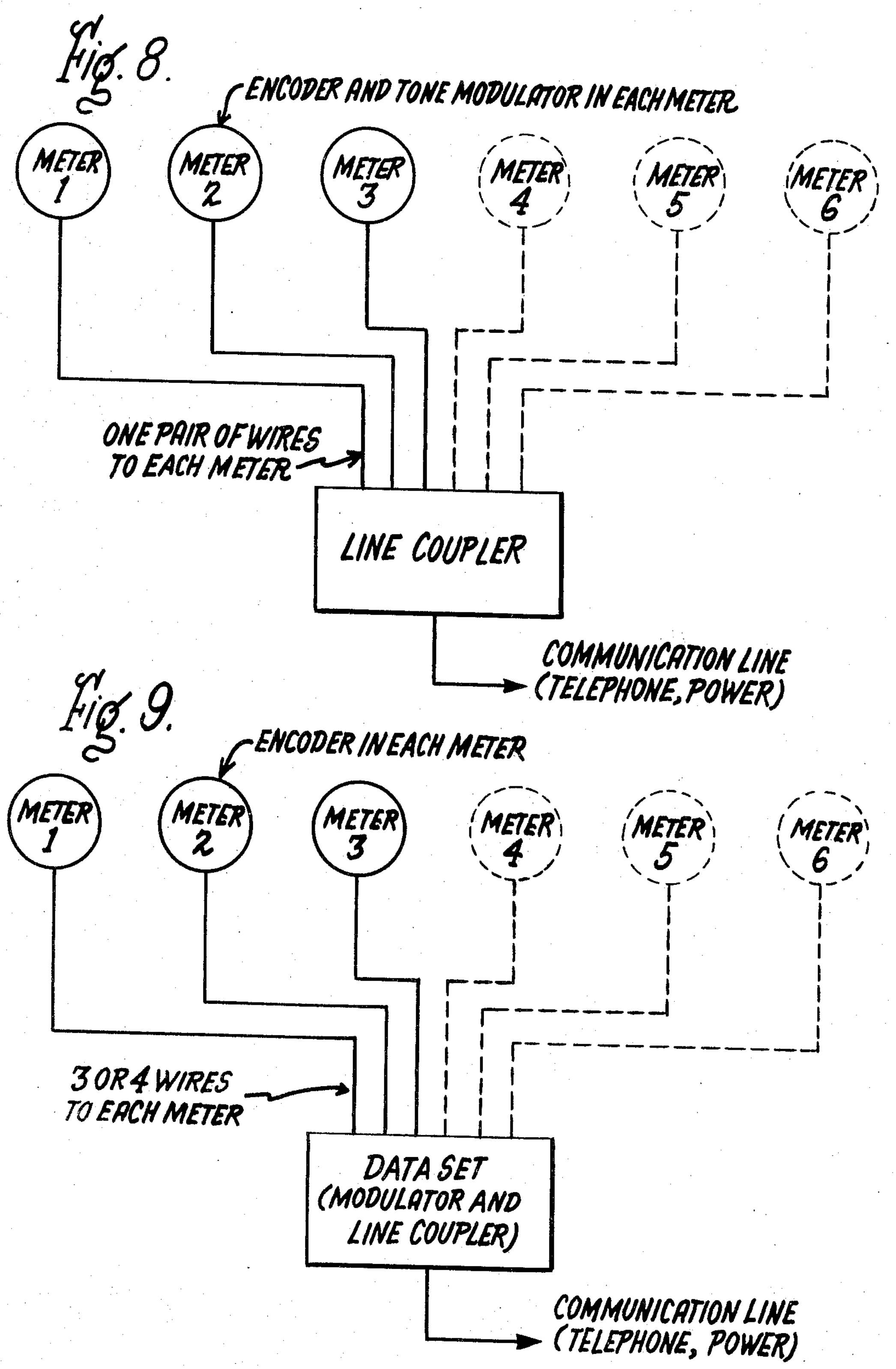
FIG. 8 shows a remote reading network of a number of meters provided with the register of FIG. 1, with a remote unit for interrogating the meters and for coupling the resultant messages to a common carrier line.
FIG. 9 shows a remote reading network of a number of meters together provided with the register of FIG. 1, with an alternative interrogating and coupling unit.

The messages may be transmitted by tone modulation through a line coupler, as shown in FIG. 8, and thereby transmitted over, for example, telephone, power, or coaxial service lines to a remote station. At the remote station, the binary message is processed and decoded to provide the desired decade reading information.

Interpositional Cross-Checking — It is an important feature of the register 10 that the positional information given by the binary position code for each disc 26 has an actual resolution of approximately one in 30. This is considerably more information than is needed to determine the ten positions for each of the dial indicators 22. By utilizing the known mechanical decade relationship between the indicator shaft 20, it is possible to determine from the coded information from each of the encoding discs 26 whether the proper decade gear train relationship exists between three adjacent indication shafts 26. In effect, the position code for a given indicator shaft 26 is cross-checked, compared with the position code of the indicator shaft 26 to either side of it to determine whether the combination of given codes is one that is possible in the decade gear train. If the information for the position of the indicator shaft 26 in question contains an error, such as may result for example when a foreign particle occludes an encoding slot 44 in the encoding disc 26, this error can be detected with high probability by digital analysis of the message. The error can thus be automatically rejected at the remote reading location. Detection at the reading station of an erroneous message also will generally indicate either a faulty meter or introduction of noise in transmission. In the latter instance the meter may simply be read again until an acceptable reading is obtained.

Further assurance of the detection of errors introduced in transmission is provided by the redundant nature of the transmitted information.

GENERAL CONSIDERATIONS

It is a feature of the remote reading register of the preferred embodiment that, generally, if any component in the encoder fails, there will result a remote reading which is unacceptable, and which also indicates to some extent the possible cause of the erroneous readings. For example, the light source is common to at least all bits of one position, so that light failure will produce an all-off combination not used as a valid code combination. Failure of the photosensor, also common to at least all bits of any position, will result in a code combination either similar to that caused by light failure or an all-on combination. Failure of the synchronous drive motor for driving the encoding disc will result in the absence of a message. For the above reasons, the code combinations of all zeros and all ones are excluded as messages.

A practical or actual resolution for sensing a dial shaft position relative to its true angular position with respect to the adjacent less significant position is ± 3°. This results in an actual resolution of one division +3° and −3° or a total of 12° out of 360° or two divisions out of 60. Between adjacent dials this means a band of two divisions on one dial corresponds to a band of 20 divisions on the next less significant dial. Conversely, the band of 20 divisions corresponds to 10 bands of two divisions each on the next more significant dial.

Looking at the relationship between dials in a slightly different way, given a coded reading on one dial, 20 divisions or one-third of the possible coded readings on an adjacent dial represent dial shaft positions that satisfy the known mechanical coupling (with its tolerances) between the dials. If a dial is in the middle of a gear train, it is mechanically coupled to a dial on either side of it. Given the two adjacent dial readings, one-third of coded readings on the center dial satisfy the mechanical relationship to the less significant dial and one-third of the previous third satisfy the mechanical relationship to the more significant dial. Thus, only one-ninth of the possible center dial coded readings are consistent with the coded readings of the two adjacent dials. It is now possible to tabulate code combinations for pairs of adjacent dials that represent shaft positions that satisfy the known mechanical relationship between the dial shafts.

As an example, consider three dials in a gear train which will be called the least significant dial, the center dial and the most significant dial. If the least significant dial reads division 6 (010100), then the code readings for the center dial which satisfy the mechanical relationship are as listed below.

| Least Significant Dial Reading | Center Dial Readings |
|---|---|
| 6. 010100 | 1. 111110 |
| | 2. 101110 |
| | 7. 010000 |
| | 8. 011000 |
| | 13. 011001 |
| | 14. 011011 |
| | *19. 000111 |
| | *20. 100111 |
| | *25. 001101 |
| | *26. 000101 |
| | *31. 011111 |
| | *32. 010111 |
| | 37. 100000 |
| | 38. 110000 |
| | 43. 110010 |
| | 44. 010010 |
| | 49. 100011 |
| | 50. 110011 |
| | 55. 101001 |
| | 56. 101000 |

Now if the most significant dial reads division 45 (010011), then the coded readings for the center dial which satisfy the mechanical relationship are as listed below.

| Most Significant Dial Reading | Center Dial Readings |
| --- | --- |
| 45. 010011 | 16. 001010 |
| | 17. 000010 |
| | 18. 000011 |
| | *19. 000111 |
| | *20. 100111 |
| | 21. 101111 |
| | 22. 101011 |
| | 23. 001011 |
| | 24. 001001 |
| | *25. 001101 |
| | *26. 000101 |
| | 27. 000100 |
| | 28. 000110 |
| | 29. 001110 |
| | 30. 001111 |
| | *31. 011111 |
| | *32. 010111 |
| | 33. 010110 |
| | 34. 110110 |
| | 35. 100110 |

Note that only those center dial readings marked with an asterisk satisfy both the relationships to the least significant dial and to the most significant dial. Thus, any coded reading received for the center dial that is not one of the six marked by an asterisk can be rejected as an error because it represents a shaft position that is not possible to obtain in the gear train. This cross-checking between dials or interdial checking provides a means of detecting encoding errors. Actually, interdial checking can detect errors introduced in the encoded meter reading at any time from the optical sensing of the code disk positions to the time the actual interdial checking is done at the remote location.

Even though interdial checking alone is effective in controlling communication errors, additional error detection is added by using redundant data transmission. The use of parity bits is a common means of error detection for data communication over the telephone network, for example. However, redundant transmission (transmitting two identical messages) is much more effective than simple parity bits and is simply generated by just two revolutions of the scan disk. At the receiving location the two messages are compared on a bit by bit basis and must be identical to be accepted as correct.

While the encoded information for the meter register of the preferred embodiment was provided by an optical encoding mechanism. Other encoding mechanisms may be used to provide the information necessary for interpositional cross-checking. For example, rotating disc contacts with stationery brushes can be used as can drum indicators of various types. Such indicators are well known in the art. Regardless of the type of encoder used, it is essential that the positional code output for each indicator shaft provides at least twice as much information as is needed to simply resolve to one of 10 reading positions for that shaft. In the preferred embodiment, for instance, about three times the amount of information needed for simply establishing the dial indicator readings is provided. That is, whereas each of the encoding discs of the preferred embodiment would need to give information as to only 20 positions for an actual resolution of about one in 10 of the total rotation of the indicator shaft to resolve dial ambiguities, it actually gives information as to 60 positions, for an actual resolution of nearly one in 30.

The illumination and detection for the encoding function can also be provided by a plurality of separate light sources and a plurality of separate detectors. However, a single source and single detector has definite advantages for the present application, as the entire system will fail at once with the failure of a single component, thus obviating difficulty in detecting the failure of a single of a plurality of light sources and detectors. Also, it is well known that the reliability of single component is greater than that of a plurality of similar components with no redundancy.

The present encoding system is arranged so that all the encoding discs are read by a single rotating scan disc. This is made possible by the semi-circular arrangement of the indicator shaft and the interposition of the scan disc between the encoding discs. The arrangement is such that the entire face of the scan disc is illuminated. It is possible, of course, to add more encoding shafts in the circle, thus extending the array of reading slots beyond the 180° of those of the preferred embodiment. Also, a much larger number of encoding discs can be arranged in a similar fashion for reading with a single scan disc by changing the dimensions of the encoding discs with respect to the radius of the circle formed by the reading apertures. By making the circle a much larger diameter, a greater number of encoding discs may be read.

The novel remote-reading register is not limited to use in an electric meter, but may be used for any meter having a mechanical register, whether a decade type register or not. The register described in the preferred embodiment for example can be readily adapted to fit a gas or water meter, in addition to being interchangeable with presently used registers in certain electric watthour meters. It will generally be desirable to provide, as in the preferred embodiment, dial indicators to permit visual reading at the meter location when desired.

The capability of the novel remote reading register to cross-check the indicator shaft positions for error is a separate and independent capability over than that of the register to resolve any ambiguity in reading the positions of the indicator shaft. Resolving of such ambiguity is a problem known in the prior art and may be dealt with in several ways. For a decade gear train, about 20 positions are generally required to resolve the ambiguity. Thus, a person designing a remote reading register which would resolve ambiguity in the reading function would ordinarily have no reason to look beyond 20 positions for each of the indicator shafts. The problems in resolving ambiguity are extensively discussed, for instance, in the prior art cited above under the heading *Background Of the Invention*.

The general approach to resolving ambiguity for a given indicator shaft is to utilize information in the next lower indicator shaft. For example, when for a given indicator shaft the indicator appears to be at the number 7, the question arises as to whether the indicator is just approaching 7 or has just passed 7, thus, presenting an ambiguity. This ambiguity may be resolved by observing the next lower order indicator. If the next lower order indicator has not yet passed zero, the higher order indicator has not yet reached number 7.

The process of cross-checking the positional information of the indicator shafts or errors is different from the problem of resolving ambiguity. In interpositional cross-checking, the position of a given indicator shaft is compared to the positions of both the next lower order shaft and the next higher order shaft to determine whether the relative positions of the three shafts are consistent with the possible position dictated by their decade gear train linking. These possible positions are determined by the initial zero position setting of the indicator shaft relative to one another. The principle of the error-checking may be illustrated as follows. Let it be assumed that a tens indicator reading is given with enough information to unambiguously define 10 positions, and that the correct reading of the unit indicator is unity. The reading of the unity indicator could be given as any number from 1 to 10 and be consistent with the tens indicator reading. Nine of these readings would appear consistent, but could actually be erroneous. If the tens indicator is now made capable of defining 20 positions, only four readings of the units indicator are consitent but erroneous, and so on. The following table illustrates this principle.

| Actual Resolution of Tens Dial | Position of Units Indicator | | |
|---|---|---|---|
| | Correct Acceptable | Erroneous Acceptable | Unacceptable |
| 10 | 1 | 9 | 0 |
| 20 | 1 | 4 | 5 |
| 30 | 1 | 2⅓ | 6⅔ |
| 50 | 1 | 1 | 8 |
| 100 | 1 | 0 | 9 |

From this table, it can be seen that the more is known about the actual position of each of the indicator shafts, the more readily it can be determined whether there is an error in the positional readings of any of the shafts.

While an actual positional resulution of as low as about one in 20 positions will permit some interpositional checking, as a practical matter and for commercial feasibility the resolution should be about on the order of one in 30 positions, as in the preferred embodiment. With such resolution, and for a register having three or more indicator shafts, as much as about 90 percent of erroneous messages can be detected.

What we claim as new and desire to secure by Letters Patent of the United States is:

1. A meter register of the type comprising at least two indicator shafts rotatably coupled to one another in a fixed ratio number of relative rotation greater than one, wherein the improvement comprises means for generating an electrical code representative of the angular position of each of said shafts to an approximate resolution of at least twice said ratio number, said means comprising:

a six bit binary code angular position indicator rigidly attached to each of said shafts, said position indicators being optical gray code encoding discs having at least six rings of optical encoding modulations at different radial locations and providing an actual resolution of about one in 30 angular positions for each of said shafts, said shafts being mutually parallel and having their ends arranged in an arc on a backplate of said register;

a single rotating scan disc comprising a series of radially spaced, angularly staggered, graded arc scan slots for scanning said encoding discs; and a series of elongated reading slots arranged in an arc configuration on said backplate, each one of said reading slots being along a line perpendicular to and intersecting one of said shafts.

2. The register defined in claim 1 and comprising:

means for illuminating the face of said scan disc remote from said reading slots, and means for electrically sensing light from said scan slots, said encoding slots, and said reading slots when they are aligned with one another.

3. A meter register of the type comprising at least two indicator shafts rotatably coupled to one another in a fixed ratio number of relative rotation greater than one, first means for generating an electrical code representative of the angular position of each of said shafts to a resolution of at least twice said ratio number, and second means for generating an electrical code for identifying said register from among a plurality of such registers, wherein said first means comprises:

a six bit gray code optical encoding disc rigidly attached to each of said shafts and having six concentric rings of optical encoding slots at different radial locations, a rotatable scan disc with central axis parallel to said shafts and comprising a series of radially spaced, angularly staggered, graded arc scan slots in one angular segment, a series of elongated shaft position reading slots arranged in an arc configuration, each one of said reading slots being along a line perpendicular to and intersecting one of said shafts, means for illuminating said scan slots from the side of said scan disc remote from said reading slots, and means for electrically sensing light from said illuminating means which passes through said scan slots, said encoding slots, and said reading slots when they are aligned with one another, and wherein said second means comprises;

an additional identification reading slot, said slot being added to the arc configuration of said shaft position reading slots so that it may be also scanned by said scan disc, and a removable code plate fastened over said identification reading slot and provided with coding apertures for generating an identification code for said register.

* * * * *